(12) United States Patent
Fukuzono et al.

(10) Patent No.: US 6,182,191 B1
(45) Date of Patent: Jan. 30, 2001

(54) RECORDING AND REPRODUCING SYSTEM (75) Inventors: Seiichi Fukuzono; Tsukasa Enomoto; Hideya Satoh, all of Kanagawa (JP)

(73) Assignee: Sony Precision Technology Inc., Tokyo (JP)

(*) Notice: Under 35 U.S.C. 154(b), the term of this patent shall be extended for 0 days.

(21) Appl. No.: 09/031,069

(22) Filed: Feb. 26, 1998

(30) Foreign Application Priority Data

Feb. 27, 1997 (JP) .................................................. 9-043925
Mar. 6, 1997 (JP) .................................................. 9-051713

(51) Int. Cl.[7] ............................. G06F 12/00; G06F 12/16
(52) U.S. Cl. ............................ 711/111; 711/154; 711/158
(58) Field of Search .......................... 711/111, 112, 158, 711/154; 707/202; 360/69, 132, 60

(56) References Cited

U.S. PATENT DOCUMENTS 4,338,644 * 7/1982 Staar .................................... 360/132
5,493,455 * 2/1996 Miyoshi et al. ....................... 360/60
5,940,232 * 8/1999 Okuyama ............................... 360/15

* cited by examiner

Primary Examiner—John W. Cabeca
Assistant Examiner—Matthew D. Anderson
(74) Attorney, Agent, or Firm—Foley & Lardner (57) ABSTRACT

A recording system such as a magnetic tape data recording and reproducing system is arranged to record data management information to three different storage devices. The recording system records management information on a record medium such as a tape, a cassette memory built in a tape cassette and a recorder memory of the recording system. A control section of the recording system first reads the management information from the cassette memory, further reads the management information from the recorder memory if the management information of the cassette memory is insufficient, and finally reads the management information from the record medium if the management information of the recorder memory is still insufficient.

17 Claims, 9 Drawing Sheets

TOC(MIN. 130BYTES~MAX. 48130BYTES)

| TAPE ATTRIBUTE INFORMATION | 128BYTES |
|---|---|
| FILE 1 (ID000) | 48BYTES |
| FILE 2 (ID001) | 48BYTES |
| ⋮ | |
| FILE 999 (ID998) | 48BYTES |
| FILE 1000 (ID999) | 48BYTES |
| CRCC | 2BYTES |

FILE INDIVIDUAL INFORMATION OF TOC
(48BYTES IN TOTAL)

| | |
|---|---|
| DEVICE TYPE CODE | 1BYTE |
| EXPANSION UNIT ETC. | 1BYTE |
| NUMBER OF CHANNELS | 1BYTE |
| RECORDING SPEED | 1BYTE |
| RECORDING START ID | 2BYTES |
| NUMBER OF ID INCREMETS IN FILE | 2BYTES |
| DATE & TIME OF START OF RECORDING | 6BYTES |
| RECORDING TIME LENGTH | 4BYTES |
| INFORMATION ON RECORDING START POSITION | 4BYTES |
| INFORMATION ON RECORDING END POSITION | 4BYTES |
| RESERVATION | 6BYTES |
| COMMENTS | 16BYTES |

RECORDING AND REPRODUCING SYSTEM

BACKGROUND OF THE INVENTION

The present invention relates to recording and reproducing system, method and format.

In a recording and reproducing system, such as a magnetic tape recording and reproducing system, management information such as tape management information and file management information is very effective for locating and identifying data. The tape management information generally includes record update information items such as date and time of recording, a serial number of recording equipment, the position of a most recent TOC (table of contents) and the total number of recorded files, and other information items about a tape as a whole such as a recording format of the tape and a tape label. The file management information comprises information (such as TOC information) to identify and locate data recorded on the tape.

There are two techniques for recording such management information.

(1) A collection of tape management information and file management information is recorded in a predetermined segment of a tape.

(2) A collection of tape management information and file management information is recorded in an IC memory in a tape cassette.

The above-mentioned first technique enables recording of a vast amount of tape management and file management information with little limitation on the type of data recorded on a tape, and the number of data files. However, the recording and reproducing system is required to record the tape management information and file management information before ejection of the tape. Movement (or search) to a tape position for the management information requires considerable time. In reproduction (or playback), the recording and reproducing system must read the tape management information and file management information on a tape, consuming time for search and reproduction. To facilitate searching, the management information is generally written in an area immediately following the beginning of a tape, and a loading/ejecting operation is always done at the beginning of the tape.

The above-mentioned second technique minimizes the time for searching, recording and reproducing with its capability of instantly storing and reading management information at the time of tape loading or ejecting. However, the IC memory is limited in storage capacity, and unable to handle a large number of files.

Recording and reproducing systems are widely used for data backup in computer systems. In various scientific and technical fields, the need for a high-speed, multi-channel data recorder capable of recording an enormous amount of data is increasing. For example, a computer system for recording, in a real time manner, measurement data such as data on vibration of a bridge, or data on noise/vibration of a motor vehicle, requires a device for backup of large volumes of data. As a data backup device, data recorders using a magnetic tape of long recording time, such as AIT (Advanced Intelligent Tape) tape or DDS (Digital Data Storage) tape based on DAT (Digital Audio Taperecorder) technology, have come into wide use. (AIT is a trademark of SONY corporation, and DDS is a registered trademark of SONY corporation.)

Figure 7:
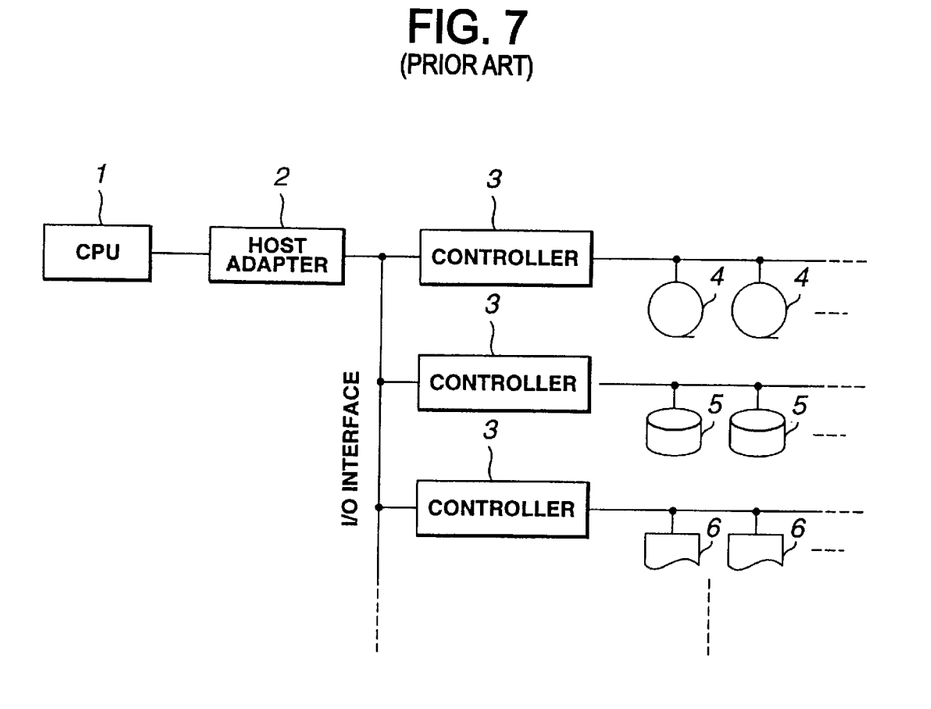
FIG. 7 is a schematic view showing a computer system in which the recording system (or streamer) of FIG. 1 can be used.

FIG. 7 shows a typical example of such a computer system in which at least one computer (a personal computer or a workstation) is connected with at least one magnetic tape data recorder. In the example of FIG. 7, a CPU 1 of a computer is connected through a host adapter (or input/output channel) 2 having a unified set of control rules (protocol), with a plurality of peripheral controllers 3. Each peripheral controller 3 is connected with one or more peripheral equipment units of a predetermined type (such as magnetic tape recorder units 4, magnetic disc units 5, or printer units 6).

SCSI (Small Computer System Interface) is an I/O interface standard applicable for connection between the host adapter 2 and the peripheral controllers 3. SCSI enables connection of peripheral controllers of various types to a SCSI bus. For example, the following are ten connectable device types in SCSI-2 (expanded version of SCSI-1).

(1) direct access device (such as magnetic disk drive)

(2) sequential access device (such as magnetic tape drive)

(3) printer device (4) processor device (5) write-once device (such as recordable optical disk drive)

(6) CD-ROM device (7) scanner device (8) optical memory device (such as erasable/writable optical disk drive)

(9) media changer device (such as library type device)

(10) communication device

A magnetic tape unit is often called streamer because of its capability of transferring data like a stream.

Figure 8:
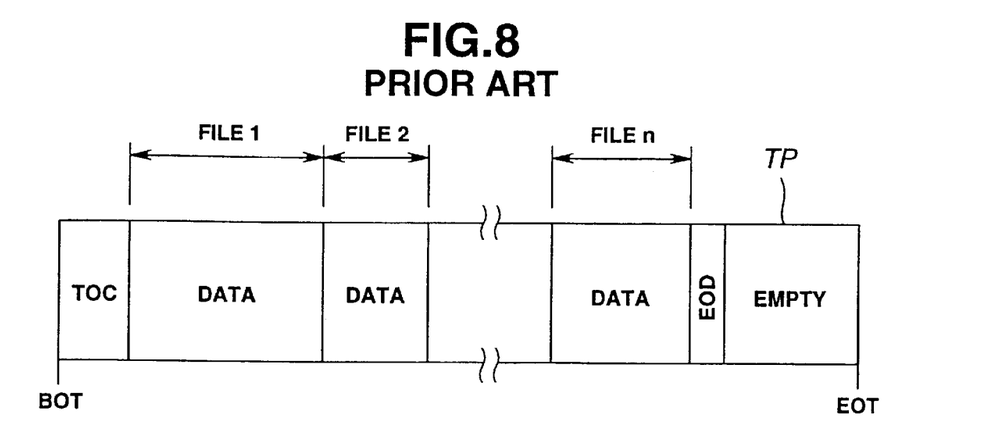
FIG. 8 is a schematic view showing a conventional tape format.

FIG. 8 shows, as an example, a format of a recording tape used in a conventional streamer. A magnetic tape TP has a record area reserved for recording management information such as TOC information (Table of Contents). In the example of FIG. 8, the record area for TOC is located immediately after the beginning of the tape BOT. The TOC information comprises various information items such as items shown in FIGS. 9, 10 and 11. From the TOC record area to an EOD area for recording EOD information indicating the end of data, near the end of the tape EOT, there are a plurality of data record areas each for recording a collection of data (or data file).

In transferring recorded data to a computer, the computer first reads the TOC information, and performs a high speed search for target data by using the TOC information, such as an information item indicating a position of a data file. For example, the information item indicating the position of a data file comprises information about a recording start position and a recording end position of the data file. With the TOC information, the tape recording and reproducing system can transfer data to a computer very rapidly by finding target data on a tape at a high speed comparable to a fast forward speed or a rewind speed, without the need for operating a FF (Fast Forward) key or a REW (Rewind) key of the tape recording system.

The conventional streamer is thus arranged to record TOC information only at a single position just after BOT (or at some other appropriate position) on a tape. This is reasonable in a way for transferring data streamingly to a computer.

When, however, a computer becomes unable to read the TOC information due to minor tape damage only in the TOC record area or some other abnormality, the ability of high speed search is readily lost notwithstanding the integrity of all the data files on a tape. In such a case, the computer must read out data items one by one from the beginning of a tape until target data is reached.

SUMMARY OF THE INVENTION

It is an object of the present invention to provide system or method or format of record medium for recording management information effectively and reliably.

According to the present invention, a data recording system comprises: a recording subsystem for recording management information for managing a sequence of data sets or data files, in a plurality of different memory areas; and a control section for retrieving data in the data sets or files by using effective management information. The control section employs, as the effective management information, the management information recorded in a first memory area when there exists a first condition for regarding readout of the management information from the first memory area as effective, and the management information recorded in a second memory area when there is a second condition for regarding readout of the management information from the second memory area as effective. The different memory areas may be areas in a memory in a cassette, a memory in a recorder and a record medium in the cassette, or may be different areas or separate areas on a record medium.

According to a first aspect of the present invention, a data recording system comprises:

a data recording section for recording data files on a record medium contained in a cassette, and for reproducing data of the data files in accordance with management information which is also recorded on the record medium;

a memory access section for allowing access to a cassette memory build in the cassette, for recording management information into the cassette memory and for reading the management information from the cassette memory;

a recorder memory for storing management information; and a control section for retrieving data from the record medium by using, as effective management information, the management information obtained from one of the cassette memory, the recorder memory and the record medium, the control section reading the management information from the cassette memory, employing the management information of the cassette memory as the effective management information if the management information of the cassette memory corresponds to the data files recorded on the record medium, reading the management information from the recorder memory if the management information of the cassette memory does not correspond to the data files recorded on the record medium, employing the management information of the recorder memory as the effective management information if the management information of the recorder memory is in agreement with the management information of the cassette memory, and reading, as the effective management information, the management information from the record medium in the cassette if the management information of the recorder memory is not in agreement with the management information of the cassette memory.

According to the first aspect of the invention, a process for reproducing data in data files recorded on a record medium in a cassette in accordance with effective management information, comprises:

a first step of reading management information recorded in a cassette memory built in the cassette loaded in a data recorder;

a second step of examining if the management information of the cassette memory corresponds to the data files recorded on the record medium;

a third step of employing the management information of the cassette memory as the effective management information if the management information of the cassette memory corresponds to the data files recorded on the record medium;

a fourth step of reading management information recorded in a recorder memory built in the data recorder if the management information of the cassette memory does not correspond to the data files recorded on the record medium, a fifth step of examining if the management information of the recorder memory is in agreement with the management information of the cassette memory;

a sixth step of employing the management information of the recorder memory as the effective management information if the management information of the recorder memory is in agreement with the management information of the cassette memory;

a seventh step of reading the management information from the record medium in the cassette if the management information of the recorder memory is not in agreement with the management information of the cassette memory.

According to a second aspect of the present invention, a data recording system comprises:

a recording section for recording a sequence of data files on a record medium; and a control section for recording a sequence of file management information sets on the record medium, each of file management information sets being recorded after one of the data files, and comprising information about a table of contents for a unique one of the data files and the data files preceding the unique one of the data files. Each data file may be a collection of data obtained from the start to the end of a recording operation.

According to the second aspect of the invention, a process for recording data on a record medium, comprises:

a plurality of recording steps for recording a sequence of data files on the record medium and a sequence of file management information sets on the record medium, each of the recording steps comprising a first sub-step of recording one of the data files, and a second sub-step of recording one of the file management information sets corresponding to the data file recorded by the first sub-step, each of the file management information sets being recorded after a corresponding one of the data files, and comprising information about a table of contents for the corresponding one of the data files and the data files preceding the corresponding one of the data files.

DETAILED DESCRIPTION OF THE INVENTION

Figure 1:
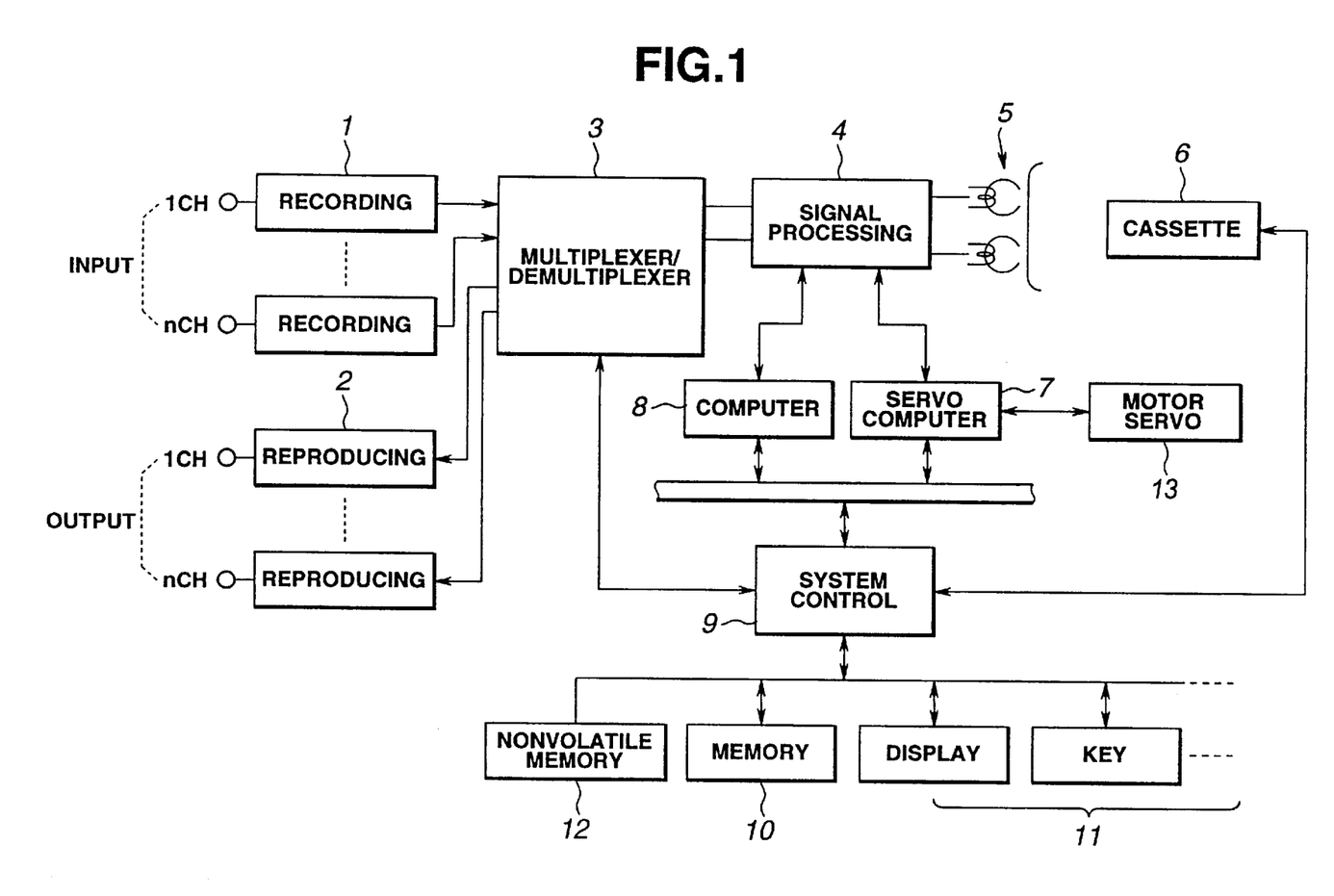
FIG. 1 is a block diagram showing a recording and reproducing system according to one embodiment of the present invention.

FIG. 1 shows a recording and reproducing system according to one embodiment of the present invention. In this example, the recording and reproducing system is a high speed, large capacity, magnetic data recorder called data streamer, employing as a record medium, a magnetic tape superior in capacitor and cost. As objects to be measured become more complicated and larger in scale, the need becomes greater for more channels, higher speed and larger capacity. However, to meet all of these three requirement is no easy matter. The data streamer provides one answer to this problem.

The data recorder of this type uses a tape cassette encasing a tape (8 mm tape, for example) suitable for backup of computer data. Specifically, the data recorder employs a deposited tape superior in output performance, reliability and endurance. The cassette further has, therein, an auxiliary memory such as an IC memory for allowing higher speed search. The auxiliary memory built in the cassette is referred to hereinafter as memory-in-cassette, or simply a cassette memory for simplification.

The data recording and reproducing system of this example is designed to reduce the time required to manage a record medium and data files recorded thereon, and to improve the reliability while making the best use of the superior performance of the data streamer.

This recording and reproducing system is arranged to record management information in a plurality of different places and to minimize the access time to the management information by selecting a source of information (among a memory built in a cassette, a memory built in a data recorder, and a record medium).

The recording system in the example shown in FIG. 1 includes a plurality of reproducing circuits for n channels 1CH~nCH, a multiplexer/demultiplexer section 3, a signal processing circuit 4, a recording and reproducing head system (recording head/reproducing head/tape) 5, a cassette loading circuit 6, a servo system circuit comprising a servo computer section 7 and a servo motor 12 for driving a tape, a signal processing computer 8, a system control circuit 9, a memory section 10, a device group 11 comprising a display unit and a key input device, and a recorder memory 12 which is a nonvolatile memory in this example.

The system control circuit 9 controls the entirety of the recording and reproducing system. Measurement data signals inputted from the input channels 1CH~nCH are sent through the recording circuits 1 (for level adjustment, A/D conversion and other preparatory operation) to the multiplexer/demultiplexer section 3 in parallel, and converted by this section 3 to a signal of a time-division multiplex mode. This signal is sent to the signal processing circuit 4, and processed together with other control signals such as a synchronizing signal and a motor servo signal, and the result is recorded on a record medium. In this example, the record medium is in the form of a magnetic tape.

The signal recorded on the tape is read out by the reproducing head of the head system 5, processed by the signal processing circuit 4 and distributed to the channels 1CH~nCH by the multiplexer/demultiplexer section 3. The thus-obtained data is taken out through the reproducing circuits 2 (for D/A conversion, level adjustment and other operations) from the output channels 1CH~nCH.

This magnetic recording and reproducing system includes the memory 10, the section 11 comprising the display unit, the key input device and an interface circuit, and the nonvolatile recorder memory 12. The system control circuit 9 can write and read data and other information to and from the nonvolatile recorder memory 12, to and from a cassette memory (or memory-in-cassette) 14 built in a tape cassette 15 loaded in the system, and to and from the tape in the tape cassette 15. The cassette memory is an IC memory in this example.

This recording and reproducing system is arranged to write and read management information to and from the tape, the cassette memory 14 and the nonvolatile recorder memory 12 in the following manner. In this example, the management information includes tape management information (or medium management information) and file management information (data management information).

The recording and reproducing system writes the tape management information and the file management information on a tape in the following manner. Each time a new data file is recorded on the tape, the recording and reproducing system records tape management information and file management information for the new data file and the files preceding the new data file, immediately after the end of the new data file. A reel of tape contains data files and management information for all the data files recorded on the tape. The tape has a sufficiently large storage capacity for storing all the file management information (tables of contents for the files).

Figure 3:
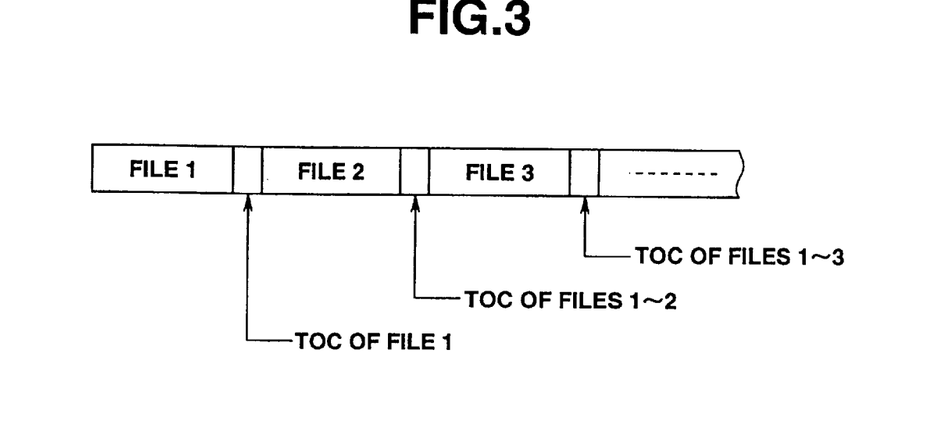
FIG. 3 is a schematic view of a magnetic tape for illustrating a recording format used in the system of FIG. 1.

The recording and reproducing system of this example records data and management information as shown in FIG. 3. The data is in the form of data files. The data files are recorded one after another from the beginning of the tape. Each data area (or segment) contains one data file and is followed immediately by a management information area or segment (or TOC area or segment). The data areas and the management information areas are alternately arranged in a line along the longitudinal direction of the tape. Each management information area contains one or more TOC units of all the preceding data files, including a TOC unit of the data file stored in the immediately preceding data area. Each TOC (table of contents) unit contains file management information for one data file. Each management information area may further contain tape management information.

In this example, each management (or TOC) area containing the TOC units for all the preceding files enables management of all the preceding data files. Therefore, even if the ability to read the first most recent TOC area is lost by tape damage or some other reason, the recording and reproducing system can reproduce the contents of the second most recent TOC area and use the contents to retrieve data in the preceding files.

Since the first data file is preceded by no other data files, the first TOC area following the first file contains only the first TOC unit of the first data file. After the second data file, the first TOC unit for the first file and the second TOC unit for the second data file are recorded in the second TOC area immediately following the second data area in which the second data file is recorded. Similarly, the third TOC area immediately following the third data area for the third data file contains the first, second and third TOC units for the first, second and third data files. In this way, the last TOC area contains the TOC units for all the data files recorded on the tape.

This method makes it possible to eject a tape cassette just after a recording operation recording file management information after a data file, without rewinding the tape. In recording, a search for a location where data is recorded is not required. In loading, however, a search for a location of tape management information and file management information is required to read the management information, so that it takes time to obtain data.

Figure 4:
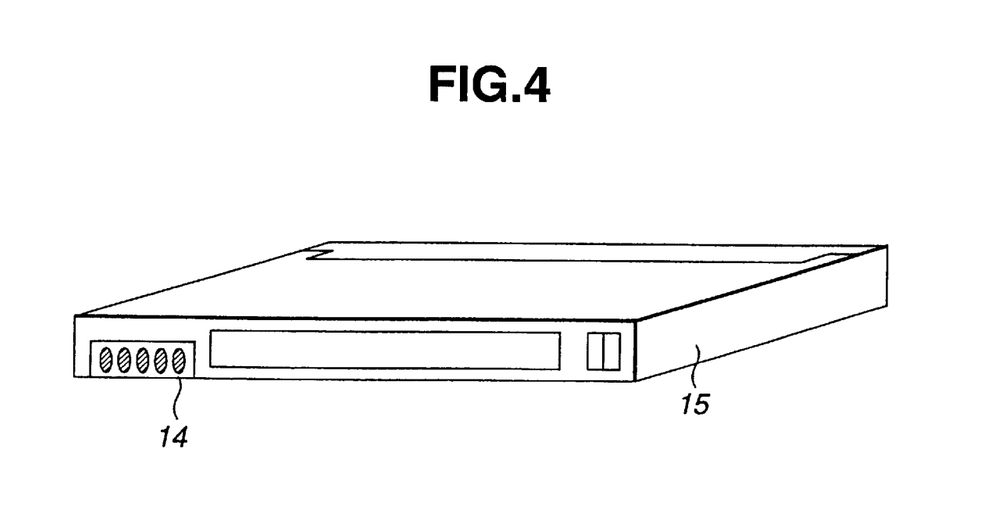
FIG. 4 is a perspective view showing a tape cassette used in the system of FIG. 1.

In this example, the recording medium is in the form of a tape, and the tape is contained in a cassette 15 as shown in FIG. 4. The cassette 15 comprises a cassette memory 14 as mentioned before. In this example, the cassette memory 14 is an IC memory built in the cassette 15. When the cassette 15 is correctly loaded in the recording and reproducing system, the cassette memory 14 is connected with the system control section 9 by a memory access circuit section of the recording and reproducing system. The recording and reproducing system of this example writes tape management information and file management information in the IC memory 14 of the cassette 15 in the following manner.

The cassette IC memory 14 of this example can hold tape management information and file management information for 20 data files. If the number of data files recorded on a tape becomes greater than 20, the recording and reproducing system of this example records tape management information and file management information for most recent 20 files.

The system control circuit 9 of the recording and reproducing system can read the contents of the cassette IC memory 14 through the circuit section connecting the control circuit 9 and the cassette memory 14. The time required for a search is very little. However, the storage capacity is small, and the amount of information the IC memory can retain is limited.

The recording medium of tape can hold a large quantity of tape management information and file management information, but the time required for search is relatively long. On the other hand, the IC memory is limited in capacity for storing tape management information and file management information, but superior in speed for search. The recording and reproducing system of this example makes the best use of the tape and the cassette IC memory in consideration of the characteristics of both recording media.

The tape and the cassette memory 14 of the cassette 15 in this example contain tape management information comprising information about a format and update information, and file management information for identifying and locating data on the tape only for that tape cassette. On the other hand, the recorder memory 12 is designed to hold management information for a plurality of tape cassettes to be loaded to the magnetic data recording and reproducing system (or data recorder). In this example, the recorder memory 12 of the recording and reproducing system is designed to enable the system control circuit 9 to immediately obtain information to identify a tape cassette currently loaded in the system, and to identify data stored in the tape cassette.

The recorder memory 12 of this example can hold management information for 20000 data files of cassettes. The recorder memory 12 holds management information for 2000 cassettes when each cassette holds 10 files. When 100 files are recorded in each cassette, then the recorder memory holds the management information for 200 cassettes.

When the cassette IC memory 14 contains tape management information and file management information for all the files recorded on the tape, that is, when the number of data files is equal to or smaller than 20, it is not required to record or use tape management information and file management information in the recorder memory 12.

In this example, the tape, the cassette IC memory 14 and the recorder memory 12 cooperate to hold and provide management information in the following manner.

The tape contains tape management information for one reel of tape, and file management information for all the files recorded on the reel of tape. The cassette memory 14 contains tape management information for one reel of tape, and file management information for 20 data files on the reel of tape. The recorder memory 12 contains tape management information for a plurality of reels of tapes corresponding to most recent 20000 files, and file management information for the most recent 20000 files.

Figure 2:
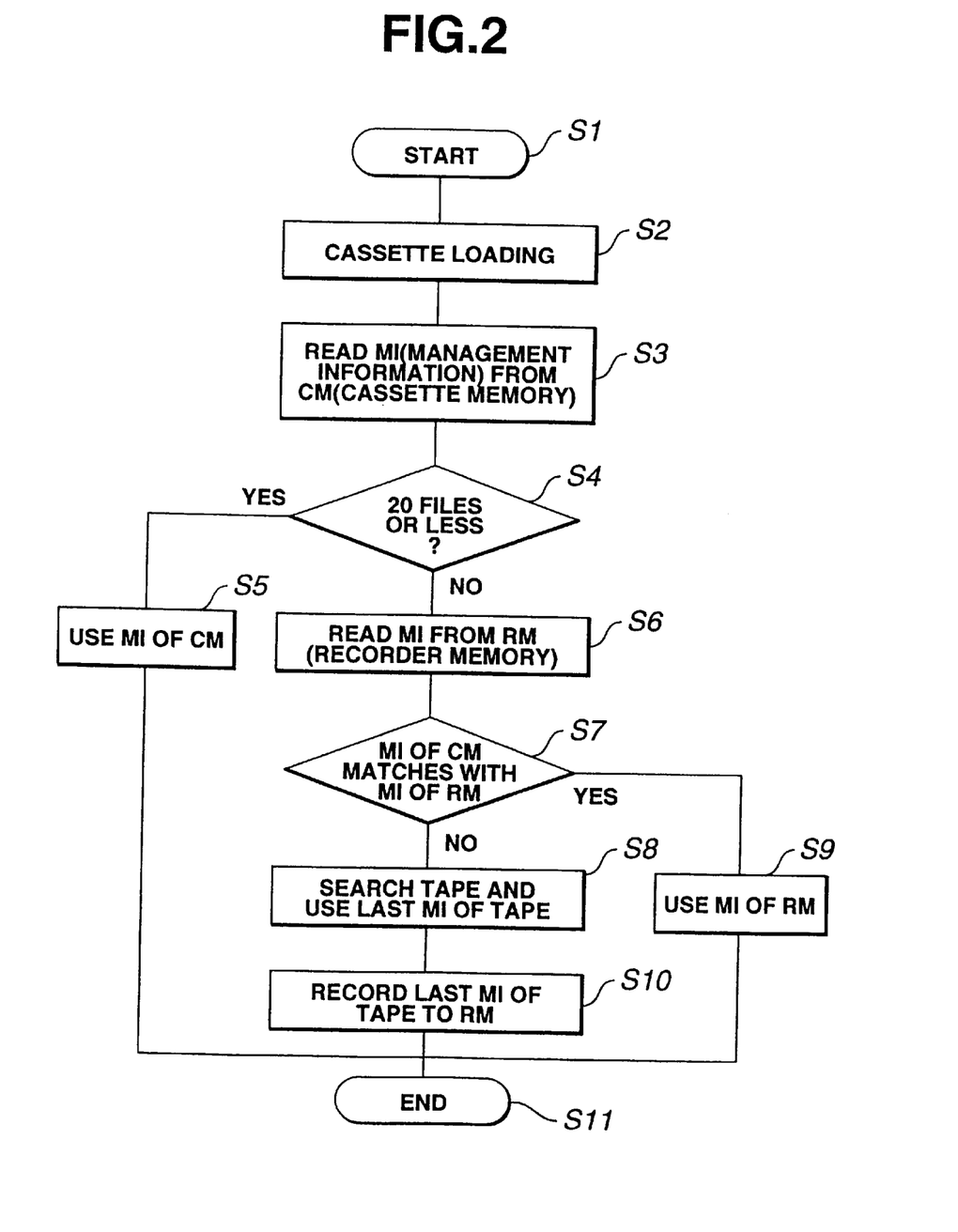
FIG. 2 is a flowchart of a control procedure performed by the recording system of FIG. 1.

FIG. 2 shows a process for obtaining management information.

The process starts from a step S1, and a tape cassette is loaded in the magnetic recording and reproducing system at a step S2. (For example, the control section of the system waits for a signal indicating a loading of the cassette 15, and proceeds to a next step upon receipt of the signal indicating the cassette loading.) Then, at a next step S3, the recording and reproducing system (or the control section of the system) reads the contents (management information MI) of the cassette memory (CM)(or memory-in-cassette) 14 of the cassette 15 loaded in the system. At a next step S4, the system (or the control section of the system) examines the contents (MI) of the cassette memory (CM) and determines whether the number of files recorded on the tape in the cassette is equal to or smaller than a predetermined number. In this example, the predetermined number is 20. For example, the tape management information comprises an information item (or a size parameter) indicative of the number of all the data files recorded on the tape, and the control section of the system checks the information item to determine whether the number of files is equal to or smaller than 20.

When the number of data files recorded on the tape in the cassette is equal to or smaller than 20, then the system proceeds to a step S5, and reads the management information MI (the tape management information and file management information) of the cassette memory (CM) 14 into the system control circuit 9. The system control circuit 9 uses the tape management information and file management information of the cassette memory 14 as effective tape management information and file management information. After the step S5, the recording and reproducing system proceeds to a step S11 and terminates the process. In this case, the recording and reproducing system does not read the contents of the recorder memory 12 and the tape.

When the number of data files recorded on the tape is greater than 20, then (the control section of) the recording and reproducing system proceeds to a step S6, and reads the contents (MI) of the recorder memory (RM) 12. The recorder memory 12 contains tape management information and file management information for most recent 20000 files of a plurality of cassettes. At a next step S7, the system examines whether the tape management information of the cassette memory 14 of the cassette 15 loaded in the system is in agreement with the contents of the recorder memory 12. If the recorder memory 12 contains tape management information in agreement with the tape management information of the cassette memory 14, the system proceeds to a step S9, and reads the management information including the tape management information and file management information of the recorder memory 12 into the system control circuit 9 for use as the effective tape management information and file management information. After the step S9, the system proceeds to the step S11 to terminate the process.

In this example, the system checks the update information of the cassette memory 14 to determine the time of the last recording operation and the equipment used for the last recording operation, and further checks the update information of the corresponding cassette stored in the recorder memory 12 to determine whether the corresponding update information in the recorder memory 12 is the same as the update information stored in the cassette memory 14. The system regards the tape and file management information in the recorder memory 12 as effective if the update information of the tape management information in the recorder memory 12 is identical to the update information of the tape management information in the cassette memory 14. If the update information for the corresponding cassette stored in the recorder memory 12 is different from the update information stored in the cassette memory 14, the system judges that this cassette has undergone a data recording operation by another recording system after a recording operation of this recording system, and regards the contents of the recorder memory 12 as ineffective.

When the recorder memory 12 does not contain tape management information corresponding to the tape management information of the cassette memory 14 of the cassette now in the system or when the recorder memory 12 does contain the corresponding tape management information but the corresponding tape management information of the recorder memory 12 is different from the tape management information of the cassette memory 14, then the recording and reproducing system proceeds from the step S7 to a step S8. At the step S8, the system obtains information on the position of the most recent TOC section from the tape management information of the cassette memory 14, searches through the tape for the most recent TOC section by using the information on its position, and reads the file management information after the last file recorded on the tape, into the system control circuit 9. Thereafter, the system proceeds to a step S10 and records the tape management information and file management information obtained from the tape, to the recorder memory 12 of the system as new management information of the cassette. After the step S10, the process ends at the step S11.

When the number of files recorded in a reel of tape is small or when the number of cassettes for normal use is small, this recording and reproducing system uses only the cassette memory or the recorder memory, and accesses tape management information and file management information very rapidly. In the case in which the total number of files rarely exceeds 20000, the time for searching and reproducing tape management information and file management information on tapes in cassettes for files over the number 20000 is not so problematical as a whole.

By selecting a source of management information, the recording and reproducing system according to this embodiment of the present invention can avoid a searching operation at the time of loading or ejecting, and reduce the time for searching in most cases. This system provides smooth operations for tape loading, ejecting, recording and reproducing.

Figure 5:
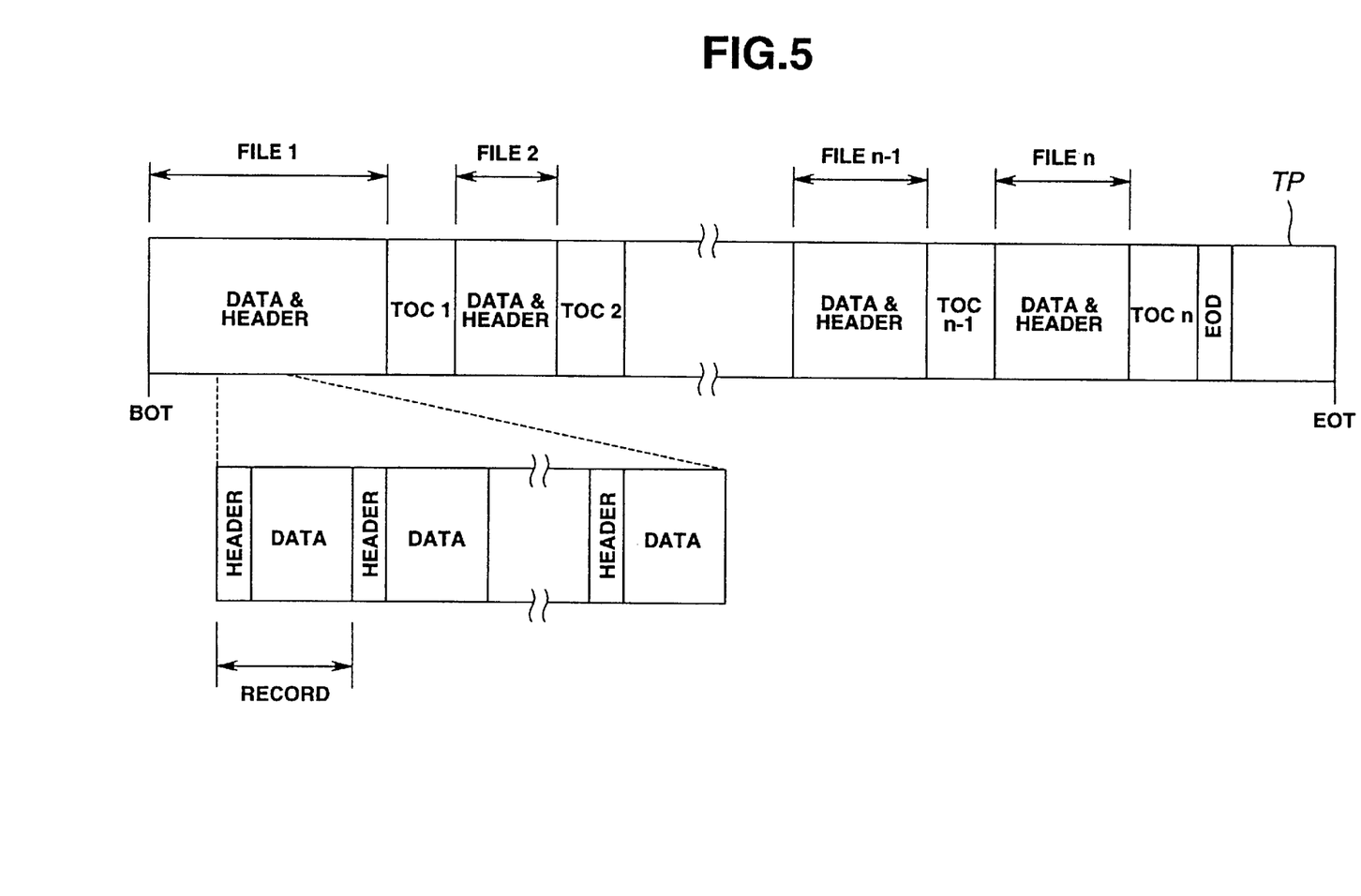
FIG. 5 is a schematic view of a tape for illustrating a recording format in one example which the recording system of FIG. 1 can employ.

FIG. 5 shows, as an example, the format of data arrangement on a recording tape in the data recording and reproducing system according to the embodiment of the present invention. In this embodiment, the recording system uses the cassette memory and the recorder memory as mentioned before. However, it is possible to use the format of FIG. 5 in a data recording and reproducing system which records management information only on a tape or in a system which does not use the cassette memory or the recorder memory.

A magnetic tape TP of the example shown in FIG. 5 is used in a tape streamer. The tape TP has a BOT for marking the beginning of data tape and an EOT for the end of tape. After the BOT, a plurality of data areas follow one after another toward the EOT. Each data area holds a collection of data which is obtained from the beginning of a data recording operation to the end of the data recording operation, and which is treated as a unit. A collection of data in each data area is called file. In the example of FIG. 5, there are n files.

Each data area of this example includes header sub-areas and data sub-areas which are arranged alternately. Each data sub-area holds data of a predetermined size (for example, a total of 544 kilobytes consisting of 8 data blocks of 68 kilobytes each). Each header sub-area holds accompanying information (called header) for facilitating a reading operation for reading data from the immediately following data sub-area. A pair of one header and data is called record. In this example, each file includes a plurality of records each of which includes a header and data of a predetermined size.

In this example, the file size is set equal to a multiple of the record size which is the sum of the header size and the data size of the data sub-areas. When the amount of data in a recording operation is not equal to the product of the data size by an integer, this system makes the file size equal to the product of the record size by an integer, by leaving a blank portion in the last data sub-area, and adding a header to the last data sub-area.

Figure 6:
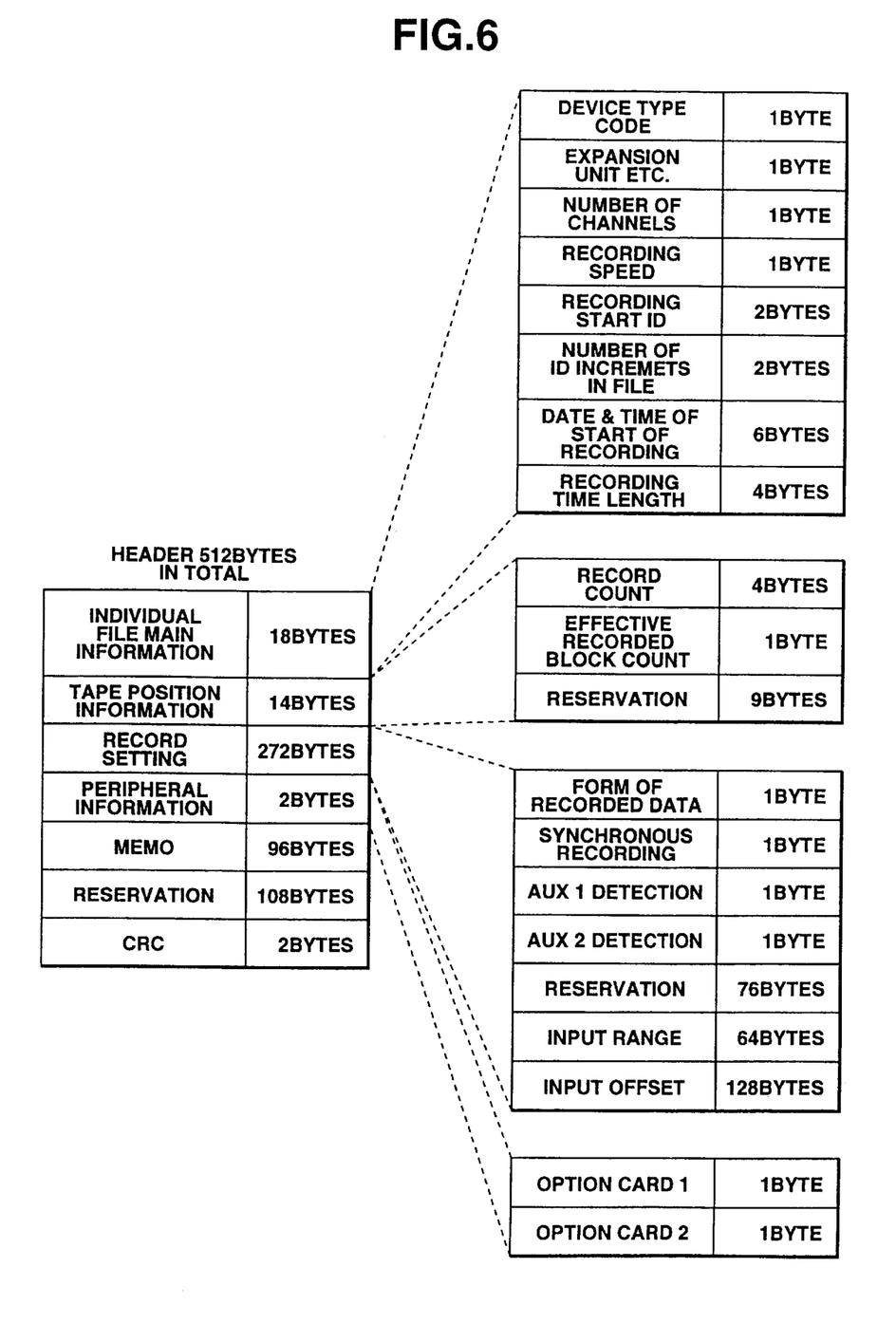
FIG. 6 is a view showing contents of headers shown in FIG. 5.

FIG. 6 shows, as an example, the contents of each header. Each header of this example includes main information on individual file (18 bytes), tape position information (14 bytes), record settings (272 bytes), information on peripheral equipment (2 bytes), memo (96 bytes), reservation (108 bytes) and CRC (2 bytes).

The individual file main information (18 bytes) includes "device type code" (1 byte) for indicating the type of the streamer, "expansion unit etc." (1 byte) for indicating addition of an expansion unit or the like to increases the number of recording channels, "number of channels" (1 byte) indicating the current number of recording channels in the streamer (for example, 16 channels when a channel expansion unit is not connected, and 32 channels when a channel expansion unit is connected), "recording speed" (1 byte) for discriminating among a normal speed and one or more other speeds (such as a double speed), "recording start ID" (2 bytes) for indicating an ID number at the time of start of data recording, "number of ID increments in file" (2 bytes) for indicating the increases in ID number in the file, "date and time of start of recording" (6 bytes) stated in terms of the day, month and year, and in terms of hour, minute and second, and "recording time length" (4 bytes) in terms of hour, minute and second.

The tape position information (14 bytes) of this example includes "record count" (4 bytes) for indicating the position of a record in a series of records in the file, "effective recorded block count" (1 byte) for indicating the number of recorded blocks containing recorded data among 8 blocks of a record, as distinguished from blank blocks left blank as mentioned before.

The section of the record settings (272 bytes) of this example comprises "form of recorded data" (1 byte) for indicating whether data is analog data or digital data, "synchronous recording" (1 byte) for indicating whether data is recorded in a synchronous manner with another streamer, "AUX1 detection" (1 byte) and "AUX2 detection" (1 byte) for indicating whether data is recorded in AUX regions, "input range" (64 bytes) for indicating a range value in each recording channel, and "input offset" (128 bytes) for indicating an offset value in each recording channel.

The peripheral information (2 bytes) of this example comprises "option card 1" (1 byte) and "option card 2" (1 byte) each for indicating the kind of an option card, and whether it is connected or not.

In CRC (cyclic redundancy check), an information polynomial in this example is; $X16+X12+X5+1$.

It is optional to change the sizes of these information items appropriately. It is further optional to eliminate some information items or to add some other information items. However, the three items, "device type code", "number of channels" and "recording speed" in the file main information are important for a computer to read recorded data. Accordingly, the header in this example always includes at least these three information items.

Reverting to FIG. 5, immediately after each file, there is a TOC recording area used for recording TOC information (management information such as file management information) regarding recorded data of a current recording operation and recorded data of all the preceding recording operations. Each time a recording operation of data in a file is completed, the system records TOC information about the currently recorded file, and all the preceding files.

After recording of the first file (FILE 1), a first TOC information set (TOC 1) is recorded in an area immediately after the first file. The first TOC information set is management information only for the first file. After recording of the second file (FILE 2), the recording system records, in an area immediately following the second file, a second TOC information set regarding both the first file and the second file. After the penultimate file (FILE (n-1)), the recording system records, in an area immediately following the penultimate file, a (n-1)st TOC information set (TOC (n-1)) for all the (n-1) files (FILE 1 ~FILE (n-1)). After the last, nth file (FILE n), the recording system records, in an area immediately following the last file, a last, nth TOC information set for all the n files from the first file (FILE 1) to the last file (FILE n). In general, the ith TOC information set (where i is any positive whole number from 1 to n) immediately after the ith file comprises TOC information for all the i files (from the first file to the ith file).

Figure 9:
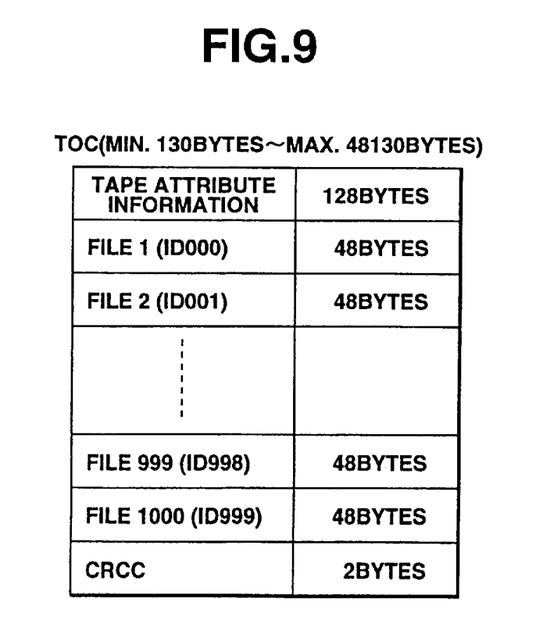
FIG. 9 is a view showing contents of TOC which can be used in the example of FIG. 5.
Figure 10:
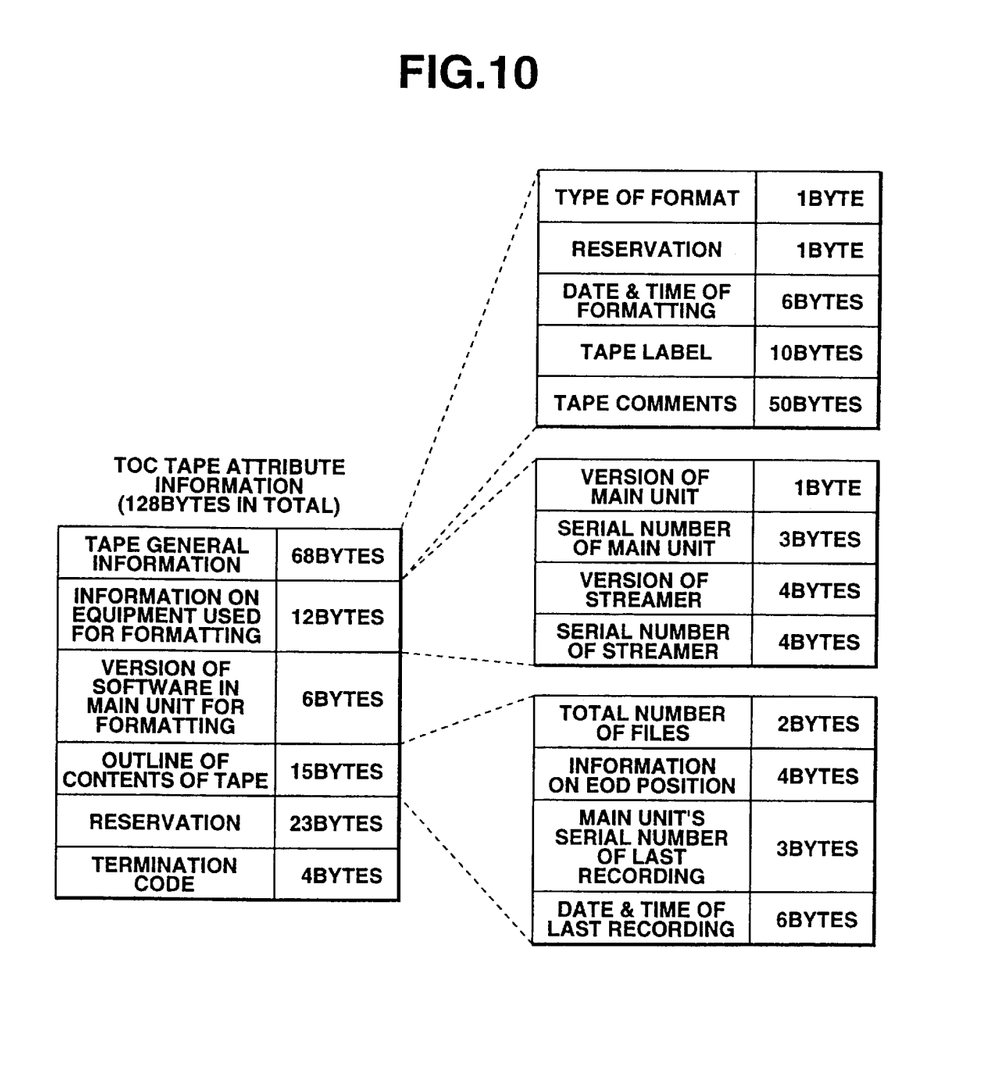
FIG. 10 is a view showing details of tape attribute information shown in FIG. 9.
Figure 11:
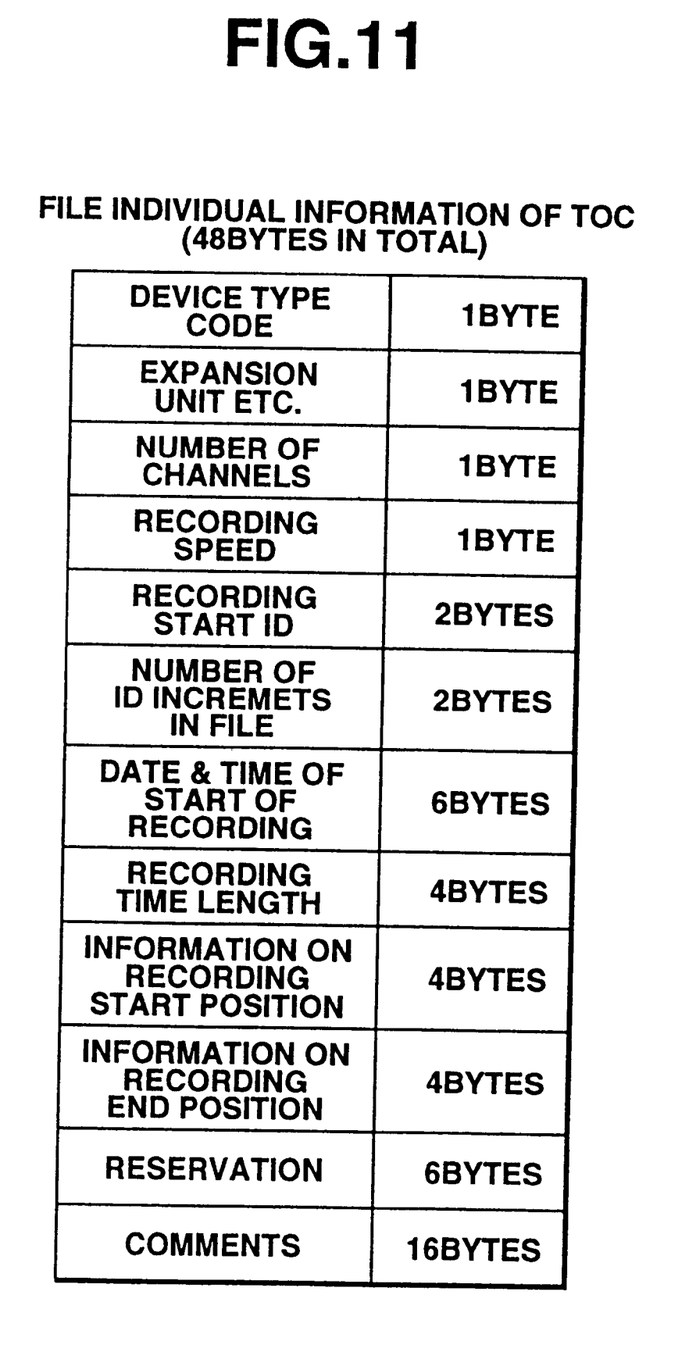
FIG. 11 is a view showing details of file information shown in FIG. 9.

In this example, each of the TOC information sets TOC~TOCn has contents as shown in FIGS. 9~11. Each of the TOC information sets comprises one or more file position information items about the position or positions of a file and preceding files. The file position information item of this example includes the recording start position and recording end position of a file, as shown in FIG. 11.

The ith TOC information set (TOCi) comprises i file position information items for all the i files from the first file to the ith file, and each file position information item includes the recording start position and the recording end position of the corresponding file. The first TOC information set (TOC1) comprises the file position information item (the start and end positions) for only the first file (FILE1). The second TOC information set (TOC2) comprises the file position information items for the first and second files. The penultimate TOC information set (TOC(n-1)) comprises the (n-1) file position information items for indicating the positions of the (n-1) files. The last TOC information set (TOCn) comprises the n file position information items for indicating the positions of all the n files.

By reading the final TOC information set TOCn, a computer can carry out a high-speed search operation for searching for recorded data in any of all the files. Any of the TOC information sets enables a high speed search for all of the corresponding file and preceding files recorded before that TOC information item.

Each TOC information set TOCi (where i is any whole number from 1 to n) includes various information sections. In the example of FIG. 9, each TOC information set TOCi includes a section of tape attribute information (128 bytes), a sequence of file management information units (or TOC information units)(48 bytes each), and a section of CRCC (Cyclic Redundancy Check Code) (2 bytes). The number of the file management information units of the ith TOC information set TOCi is equal to i. The tape attribute information and each file management information unit are shown more in detail in FIGS. 10 and 11. If the number of recorded files is zero, the TOC size is minimum (130 bytes, that is, the sum of the tape attribute information and CRCC). The size of the TOC set increases as the number of recorded files increases. When the number of files is 1000, the TOC size is 48130 bytes. When, for example, a maximum number of files is 1000, the maximum TOC size is 48130 bytes.

Some information items in the individual file management information shown in FIG. 11 have the same names used in the header shown in FIG. 2. Each of these information items has contents identical to the contents of the corresponding item of the header.

After the recording operations of the final data file (FILEn) and the final TOC information set (TOCn), the recording system records the EOD marker in an area immediately after the last TOC area.

By using the EOD marker, the computer can judge that the TOC information set immediately before the EOD marker is the last TOC information.

In a process of recording data on a tape, this streamer additionally records TOC information and headers on the tape according to the above-mentioned format.

In a process for transferring recorded data from the streamer to the computer, the computer normally reads the last TOC information set TOCn just before EOD, and obtains recorded data in a target file among all the files by a high speed search based on the last TOC information.

If the computer fails to read the last TOC information set TOCn because of damage in the recording area of the last TOC set on the tape or some other reason, the computer reads the penultimate TOC information set TOC(n-1). By using TOC(n-1), the computer can perform a high speed search for recorded data in all the files but the last file. If the last two TOC information sets TOCn and TOC(n-1) are unreadable or inaccessible by the computer, the computer reads the TOC information set TOC(n-2) and performs a high speed search through the (n-2) files excluding the last two files.

Even if one or more TOC information sets become unobtainable, this recording system uses the rearmost effective TOC information set and allows the high speed search for all the files except the files after the rearmost effective TOC information set.

This format facilitates a recovery process, too. If, for example, only the last TOC information set is unreadable, the system can readily rerecord the last TOC information set on the tape by using the penultimate TOC information set and the recorded data in the last file. It is not necessary to read the recorded data of all the files. This system can reduce the time required for the recovery process as compared to the conventional example having only one recording area for TOC.

In the present invention, it is optional to change the data size of each information items in TOC1~TOCn, to add one or more other information items to TOC1~TOCn, and eliminate one or more information items from TOC1~TOCn, except for the recording position information item such as the recording start and end positions.

In the example of FIG. 5, TOC information (for all of the recorded files) is recorded for each collection of data (that is, each data file). However, the recording system may be arranged to record TOC information after each recording of data of a predetermined size, or after each recording of a predetermined recording time length.

In the example of FIG. 5, each TOC area is immediately after the corresponding data area. However, it is possible to place a TOC area at an appropriate position at a distance after the corresponding data file.

In the example of the present invention shown in the figures, a data recording system comprises a data recording subsystem and a control section. The subsystem of the example comprises a data recording section (comprising one or more items such as a recording head, for example), a memory access section for enabling access to a cassette memory (or memory-in-cassette) and a recorder memory which is a component of the recording system, not a component of a cassette. The control section is connected with the data recording section, the memory access section and the recorder memory by respective lines (which may comprise a bus), and configured to control recording operations.

In one example according to the second aspect of the present invention, a process for recording data on a record medium such as a tape, comprises a recording process section for recording a sequence of data files or collections of data on the record medium and a sequence of file management information sets (or data management information sets) on the record medium. The recording process section may comprise a first subsection of recording one of the data files, and a second subsection of recording one of the file management information sets corresponding to the data file recorded by the first subsection in such a manner that each of the file management information sets is recorded after a corresponding one of the data files. Each file management information set comprises information about a table of contents for the corresponding one of the data files and the data files preceding the corresponding one of the data files.

In one of possible examples, the first subsection of the recording process section comprises a first step of recording an ith data file on a record medium upon receipt of the ith data file (or in the case of receipt of the ith data file), and the second process subsection comprises a second step of obtaining 1st~(i−1)st TOC information units (for example, from a preceding record area on the record medium), a third step of preparing an ith TOC information unit (for example, from the ith data file recorded on the record medium) and a fourth step of recording a collection (or sequence) of the 1st~ith TOC information units on the record medium in a record area after a record area of the ith data file.

The process may further comprises an initialization section and a concluding section, and the recording section is placed between the initialization process section and the concluding process section.

The first step follows the initialization section and may comprise a first sub-step of examining whether an ith data file is received or not, and a second sub-step of recording the ith data file on the record medium when the ith file is received. When the ith file is not received, the recording system waits until the ith file is received, by returning to the first sub-step, for example.

The process may further comprise a condition discriminating process section of determining whether a sufficient amount of data is recorded on the record medium or not. If it is not, the process increases the number i by one and returns to the first step to record the next data file and its file management information. If the amount of data recorded is sufficient, then the process proceeds to the concluding section. For example, the condition discriminating section comprises an examining step of examining whether i is equal to or greater than n, and an incrementing step of increasing i by one (i=i+1). If i≧n, then the recording system proceeds to the concluding section. If i<n, then the recording system proceeds to the incrementing step and then returns to the first step to record an (i+1)st data file.

The initialization section may comprise any one or more of a step of detecting a loading of a cassette, a step of recording a BOT, and a step of setting i equal to one. The concluding section may comprise a step of recording an EOD.

In this example, the first step follow the initializing section, the second step follows the second sub-step of the first step, the third step is next to the second step, and the fourth step is next to the third step. The examining step is next to the fourth step. The YES side of the examining step is connected to the concluding section, and the NO side of the examining step is connected to the incrementing step. From the incrementing step, the program returns to the first step.

In one example, a recording and reproducing system according to the second aspect of the invention may be configured to carry out a process in the following manner.

The process of this example comprises a reading process section comprising a first process subsection for obtaining an effective file management information set, and a second process subsection of finding target data by using the effective file management information set. The process section may comprise a first operation of reading a first most recent file management information set from a record medium, a second operation of determining whether readout of the most recent file management information set is effective (or successful) or not, a third operation of employing the most recent file management information as the effective file management information set for searching for desired data on the record medium if the readout of the most recent file management information set is effective, a fourth operation of reading a second most recent file management information set if the readout of the first most recent is not effective, a fifth operation of determining whether readout of the second most recent file management information set is effective or not, and so on. For example, the first most recent management information set may be a rearmost management information set immediately before EOD, or closest to EOD, and the second most recent management information set may be a management information set immediately preceding the first most recent management information set.

For example, the first process subsection comprises a first step of reading an ith file management information set (where i is first set to n), a second step of examining whether there exists a predetermined condition for determining that the readout is effective. If the predetermined condition exists, then the process employs the file management information set as the effective one at a third step, and proceeds to the second process section. If the predetermined condition is not satisfied, then the process proceeds to a decrement step for decreasing i by one, and then to the first step. The second process subsection comprises a forth step of searching desired data in accordance with the effective file management information set, and a fifth step of outputting the obtained data out of the recorder.

The process may further comprise an initialization section before the first step. The initialization section may comprise any one or more of a step of detecting a loading of a cassette, a step of receiving a data request signal requesting target data, a step of setting i to n.

What is claimed is:

1. A data recording system comprising:
   a data recording section for recording data files on a record medium contained in a cassette, and for reproducing data of the data files in accordance with management information which is also recorded on the record medium, the data recording section being a section in a data recorder;
   a memory access section for allowing access to a cassette memory build in the cassette, for recording management information into the cassette memory and for reading the management information from the cassette memory, the memory access section being a section in the data recorder;
   a recorder memory for storing management information, the recorder memory being a memory built in the data recorder; and
   a control section for retrieving data from the record medium by using, as effective management information, the management information obtained from one of the cassette memory, the recorder memory and the record medium, the control section reading the management information from the cassette memory, employing the management information of the cassette memory as the effective management information if the management information of the cassette memory corresponds to the data files recorded on the record medium, reading the management information from the recorder memory if the management information of the cassette memory does not correspond to the data files recorded on the record medium, employing the management information of the recorder memory as the effective management information if the management information of the recorder memory is in agreement with the management information of the cassette memory, and reading, as the effective management information, the management information from the record medium in the cassette if the management information of the recorder memory is not in agreement with the management information of the cassette memory.

2. The data recording system as claimed in claim 1 wherein the management information of the cassette memory comprises medium management information and file management information, the management information of the recorder memory comprises medium management information and file management information, the management information of the record medium comprises file management information, and the control section is configured to read the medium management information and the file management information from the cassette memory, to judge from the medium management information of the cassette memory whether a first condition is satisfied, to employ the file management information of the cassette memory as effective file management information if the first condition is satisfied, to read the medium management information and file management information from the recorder memory only if the first condition is not satisfied, to judge from the medium management information of the cassette memory and the medium management information of the recorder memory whether a second condition is satisfied, to employ the file management information of the recorder memory as the effective file management information if the second condition is satisfied and to reproduce the file management information of the record medium only if the second condition is not satisfied, the medium management information of the cassette memory comprising an information item indicative of a number of recorded files on the record medium, the first condition being satisfied when the number of recorded data files on the record medium is equal to or smaller than a predetermined number, the second condition being satisfied when the medium management information of the recorder memory is in agreement with the medium management information of the cassette memory.

3. The data recording system as claimed in claim 2 wherein the control section is configured to obtain the file management information from the record medium and to record the file management information obtained from the record medium into the recorder memory when the second condition is not satisfied.

4. The data recording system as claimed in claim 3 wherein the management information of the record medium comprises the file management information and medium management information, and the control section is configured to read the medium management information and the file management information from the record medium and to replace the medium management information and the file management information of the recorder memory with the medium management information and the file management information of the record medium when the medium management information and the file management information is obtained from the record medium; and wherein the medium management information of each of the cassette memory and the recorder memory comprises an update information set about a most recent recording operation, and the second condition is a condition which is satisfied when the update information set of the recorder memory is in agreement with the update information set of the cassette memory.

5. The data recording system as claimed in claim 2 wherein the data recording section comprises heads for recording and reading data on the record medium, the access section comprises a circuit section for connecting the cassette memory with the control section, the cassette memory is an IC memory whose memory capacity is smaller than a memory capacity of the recorder memory, and the record medium is a magnetic tape on which the data files are recorded one after another.

6. The data recording system as claimed in claim 5 wherein the data recording system further comprises a tape drive section, and the control section comprises a system control circuit for controlling the data recording section, the tape drive section, the memory access section and the recorder memory.

7. The data recording system as claimed in claim 2 wherein the file management information comprises a plurality of file information sets, and the control section is configured to record the data files sequentially on the record medium with the data recording section, and to further record each of the file information sets on the record medium after one of the data files, each of the file information sets comprises information for managing a unique one of the data files and information for managing all the data files preceding the unique one of the data files.

8. The data recording system as claimed in claim 7 wherein the control section is configured to sequentially record the file information sets each of which corresponds to a unique one of the data files and comprises a TOC information unit for managing the unique one of the data files and TOC information units for managing the data files preceding the unique one of the data files; and wherein the control section is configured to record a unique one of the file information sets after each of the data files.

9. The data recording system as claimed in claim 8 wherein the control section is configured to record a sequence of the data files and a sequence of the file information sets so that each of the file information sets is recorded after a corresponding one of the data files, and the control section is further configured to record a most recent data file after the sequence of the data files and further record a most recent file information set after the most recent data file, the most recent file information set comprises a sequence of the TOC information units and a most recent TOC information unit for managing the most recent data file, each of the file information sets preceding the most recent information set comprises a consecutive subsequence obtained from the sequence of the TOC units by consecutively selecting a first entity and subsequent entities of the sequence of the TOC units.

10. The data recording system as claimed in claim 9 wherein the control section is configured to record a new data file after the most recent file information set, to prepare a new file information set from the most recent file information set and the new data file, and to record the new file information set on the record medium after the new data file; and wherein the control section is configured to record each of the data files in a unique one of data recording areas on the record medium and each of the file information sets in a unique one of the TOC recording area on the record medium in such a manner that the data recording areas and the TOC recording areas are arranged alternately on the record medium.

11. A process for reproducing data in data files recorded on a record medium in a cassette in accordance with effective management information, comprising:

a first step of reading management information recorded in a cassette memory built in the cassette loaded in a data recorder;

a second step of examining if the management information of the cassette memory corresponds to the data files recorded on the record medium;

a third step of employing the management information of the cassette memory as the effective management information if the management information of the cassette memory corresponds to the data files recorded on the record medium;

a fourth step of reading management information recorded in a recorder memory built in the data recorder if the management information of the cassette memory does not correspond to the data files recorded on the record medium, a fifth step of examining if the management information of the recorder memory is in agreement with the management information of the cassette memory;

a sixth step of employing the management information of the recorder memory as the effective management information if the management information of the recorder memory is in agreement with the management information of the cassette memory; and a seventh step of reading the management information from the record medium in the cassette if the management information of the recorder memory is not in agreement with the management information of the cassette memory.

12. The process as claimed in claim 11 wherein the management information of the cassette memory comprises medium management information and file management information, the management information of the recorder memory comprises medium management information and file management information, the management information of the record medium comprises file management information, and the first step comprises an operation of reading the medium management information and the file management information from the cassette memory, the second step comprises an operation of judging from the medium management information of the cassette memory whether a first condition is satisfied, the third step comprises an operation of employing the file management information of the cassette memory as effective file management information if the first condition is satisfied, the fourth step comprises an operation of reading the medium management information and file management information from the recorder memory only if the first condition is not satisfied, the fifth step comprises an operation of judging from the medium management information of the cassette memory and the medium management information of the recorder memory whether a second condition is satisfied, the sixth step comprises an operation of employing the file management information of the recorder memory as the effective file management information if the second condition is satisfied, the seventh step comprises an operation of reproducing the file management information of the record medium only if the second condition is not satisfied, the medium management information of the cassette memory comprising an information item indicative of a number of recorded files on the record medium, the first condition being satisfied when the number of recorded data files on the record medium is equal to or smaller than a predetermined number, the second condition being satisfied when the medium management information of the recorder memory is in agreement with the medium management information of the cassette memory; wherein the seventh step comprises an operation of recording the file management information obtained from the record medium into the recorder memory when the second condition is not satisfied; and wherein the management information of the record medium comprises the file management information and medium management information, and the seventh step comprises an operation of reading the medium management information and the file management information from the record medium and replacing the medium management information and the file management information of the recorder memory with the medium management information and the file management information of the record medium when the medium management information and the file management information is obtained from the record medium; and wherein the medium management information of each of the cassette memory and the recorder memory comprises an update information set about a most recent recording operation, and the second condition is a condition which is satisfied when the update information set of the recorder memory is in agreement with the update information set of the cassette memory.

13. A data recording system comprising:

a recording section for recording a sequence of data files on a record medium in the form of a tape; and a control section for recording a sequence of file management information sets on the record medium, each of file management information sets being recorded at an area immediately after one of the data files, and comprising file management information about a table of contents for a unique one of the data files and all of the data files preceding the unique one of the data files.

14. The data recording system as claimed in claim 13 wherein the control section is configured to sequentially record the file management information sets each of which corresponds to a unique one of the data files and comprises a TOC information unit for managing the unique one of the data files and TOC information units for managing the data files preceding the unique one of the data files.

15. The data recording system as claimed in claim 14 wherein the control section is configured to record a unique one of the file information sets after each of the data files; wherein the control section is configured to record a sequence of the data files and a sequence of the file information sets so that each of the file information sets is recorded after a corresponding one of the data files, and the control section is further configured to record a most recent data file after the sequence of the data files and further record a most recent file information set after the most recent data file, the most recent file information set comprises a sequence of the TOC information units and a most recent TOC information unit for managing the most recent data file, each of the file information sets preceding the most recent information set comprises a consecutive subsequence obtained from the sequence of the TOC units by consecutively selecting a first entity and subsequent entities of the sequence of the TOC units; and wherein the control section is configured to record a new data file after the most recent file information set, to prepare a new file information set from the most recent file information set and the new data file, and to record the new file information set on the record medium after the new data file; and wherein the control section is configured to record each of the data files in a unique one of data recording areas on the record medium and each of the file information sets in a unique one of the TOC recording area on the record medium in such a manner that the data recording areas and the TOC recording areas are arranged alternately on the record medium.

16. A process for recording data on a record medium, comprising:

a plurality of recording steps for recording a sequence of data files on the record medium and a sequence of file management information sets on the record medium, each of the recording steps comprising a first sub-step of recording one of the data files, and a second sub-step of recording one of the file management information sets corresponding to the data file recorded by the first sub-step, each of the file management information sets being recorded after a corresponding one of the data files, and comprising information about a table of contents for the corresponding one of the data files and the data files preceding the corresponding one of the data files.

17. The process as claimed in claim 16 wherein each of the file management information sets corresponds to a unique one of the data files and comprises a TOC information unit for managing the unique one of the data files and TOC information units for managing the data files preceding the unique one of the data files; wherein each of the file information sets is recorded after a corresponding one of the data files, and the process further comprises a most recent recording step of recording a most recent data file after the sequence of the data files and further recording a most recent file information set after the most recent data file, the most recent file information set comprises a sequence of the TOC information units and a most recent TOC information unit for managing the most recent data file, each of the file information sets preceding the most recent information set comprises a consecutive subsequence obtained from the sequence of the TOC units by consecutively selecting a first entity and subsequent entities of the sequence of the TOC units; wherein the process further comprises a new data recording step of recording a new data file after the most recent file information set, preparing a new file information set from the most recent file information set and the new data file, and recording the new file information set on the record medium after the new data file; and wherein in each recording step, the data file is recorded in a unique one of data recording areas on the record medium and the file information set is recorded in a unique one of the TOC recording area on the record medium in such a manner that the data recording areas and the TOC recording areas are arranged alternately on the record medium.

* * * * *